INVENTOR
FRANK J. FINK
BY
McNENNY, FARRINGTON, PEARNE & GORDON
ATTORNEYS

June 1, 1971 F. J. FINK 3,581,372
AUTOMATIC WRENCH
Filed March 24, 1969 3 Sheets-Sheet 2
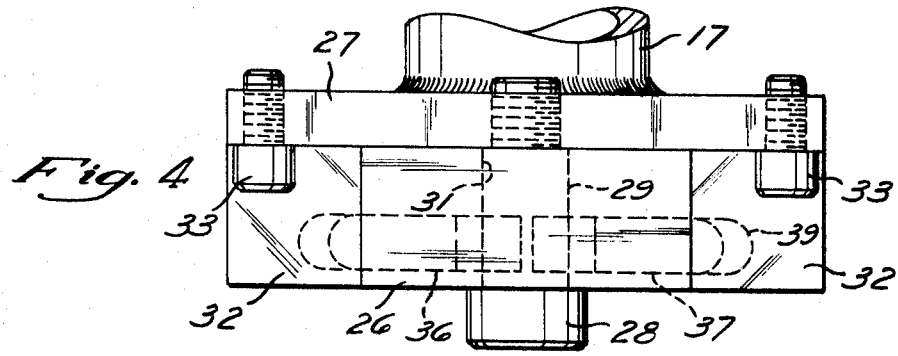
Fig. 4
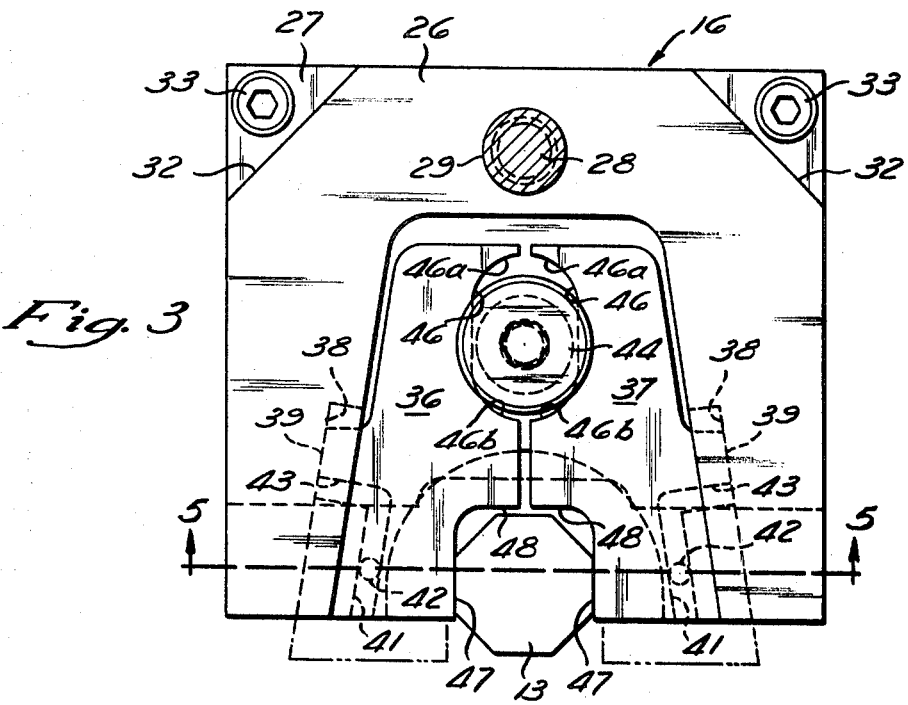
Fig. 3
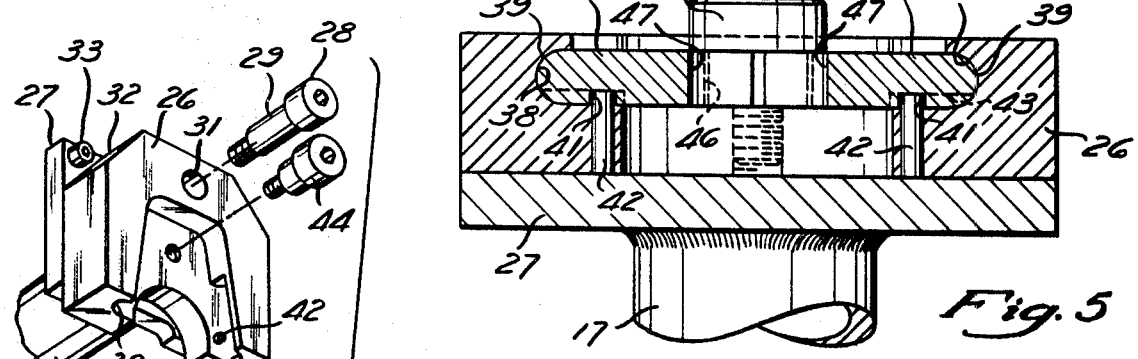
Fig. 6
Fig. 5
INVENTOR
FRANK J. FINK
BY
McNENNY, FARRINGTON, PEARNE & GORDON
ATTORNEYS

INVENTOR
FRANK J. FINK
BY
MCNENNY, FARRINGTON, PEARNE & GORDON

ATTORNEYS

United States Patent Office 3,581,372
Patented June 1, 1971

3,581,372
AUTOMATIC WRENCH
Frank J. Fink, Chardon, Ohio, assignor to Imperial Manufacturing & Engineering Co., Middlefield, Ohio
Filed Mar. 24, 1969, Ser. No. 809,810
Int. Cl. B25b 13/18
U.S. Cl. 29—240  10 Claims

ABSTRACT OF THE DISCLOSURE

An automatic wrench mechanism is disclosed which is capable of automatically gripping an article formed with wrenching flats even when such article is rotating at the time gripping occurs. The mechanism includes a yoke pivotally supported on a frame and provided with two jaw members which are movable between an extended release position and a gripping position. The yoke and jaw members are provided with mating camming surfaces which are inclined toward each other so that movement of the jaws toward the gripping position causes the jaws to move toward each other. The two jaws are separately movable with respect to the yoke to facilitate the gripping of a rotating article.

BACKGROUND OF INVENTION

This invention relates generally to wrenching mechanisms and more particularly to a novel and improved automatic wrench assembly adapted to engage and grip a rotating nut or article having wrenching flats formed thereon.

It is desirable in some instances to provide a wrench which is automatically adjustable and which can be used to engage and grip a rotating article provided with wrenching flats. For example, in my copending application Ser. No. 686,641, filed Nov. 29, 1967, I disclose an indexing machine system wherein a workpiece is threaded onto a threaded workpiece support at a loading station and after being carried to a plurality of work stations is delivered to an unloading station where the workpiece is threaded off of the workpiece holder. In this indexing machine system means are provided to rotate the workpiece holder at one or more stations so the finished workpiece can be power threaded off of the work holder if it is held against rotation with the holder at the unloading station. Automatic powered removal of the workpiece from the work holder is accomplished therefore if an automatically adjustable wrenching mechanism is provided which is capable of engaging and gripping the workpiece while it is rotating.

PRIOR ART

Various types of adjustable wrenching devices have been proposed. In some instances these wrenches include adjustable jaw means which operate to automatically adjust themselves to the size of the nut or the like being gripped. Examples of such wrenching devices are disclosed in the United States Letters Patents 1,561,812 and 3,195,381.

SUMMARY OF INVENTION

A wrenching mechanism incorporating this invention is particularly suited for engaging and automatically gripping a rotating article having wrenching flats. In the illustrated embodiment the wrenching device is provided with two opposed jaw members supported by a yoke or frame. The yoke and the jaw members are provided with mating camming surfaces arranged so that movement of the jaw members in one direction with respect to the yoke causes the jaw members to move toward each other, and relative movement in the opposite direction causes the jaw members to move apart. The two jaws are independently supported in the yoke and are free to move independently with respect to the yoke. The camming action operates to automatically cause the jaws to position themselves with respect to each other so that they properly fit the wrenching flats of a rotating article when the wrenching mechanism is brought onto the article. The fact that the jaws are separately movable with respect to the yoke along their camming surfaces improves the ability of the wrenching mechanism to efficiently grip an article even though it is rotating at the time the wrench engages the article.

In the illustrated embodiment the wrench is arranged to automatically move into engagement with a rotating workpiece which is threaded onto a workpiece holder mounted on an indexing table. As soon as the wrench properly grips the workpiece, it holds the workpiece against rotation with respect to the work holder and causes the workpiece to be threaded off of the work holder. The wrenching mechanism is arranged so that the workpiece falls free due to gravity as soon as it is removed from the workpiece holder. A power-operated mechanism is provided to retract the wrenching mechanism to an idle position and to extend the wrenching mechanism into gripping engagement with the workpiece. Further, the support for the wrenching mechanism is provided with means to automatically compensate for misalignment.

DESCRIPTION OF THE DRAWINGS

FIG. 3 is an enlarged view of the wrenching mechanism per se;

FIG. 4 is a plan view of the wrenching mechanism illustrated in FIG. 3;

FIG. 5 is a cross section taken along 5—5 of FIG. 3;

FIG. 6 is an exploded view of the wrenching mechanism; and,

DETAILED DESCRIPTION OF THE DRAWINGS

Figure 1:
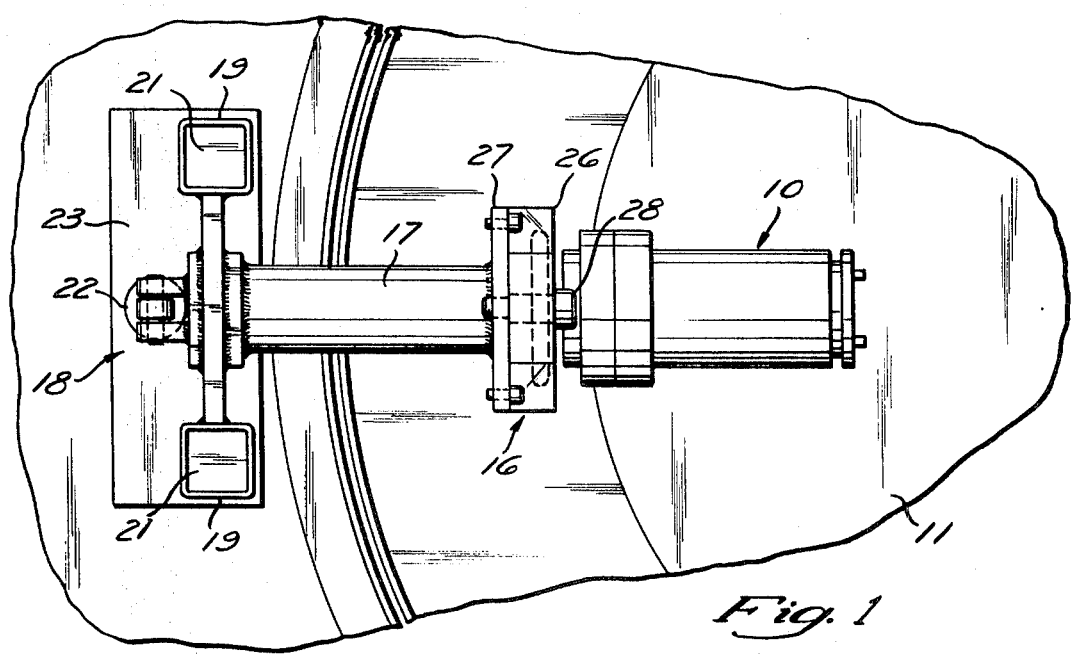
FIG. 1 is a fragmentary plan view of a preferred embodiment of this invention installed for automatic removal of a workpiece from an indexing machine system.
Figure 2:
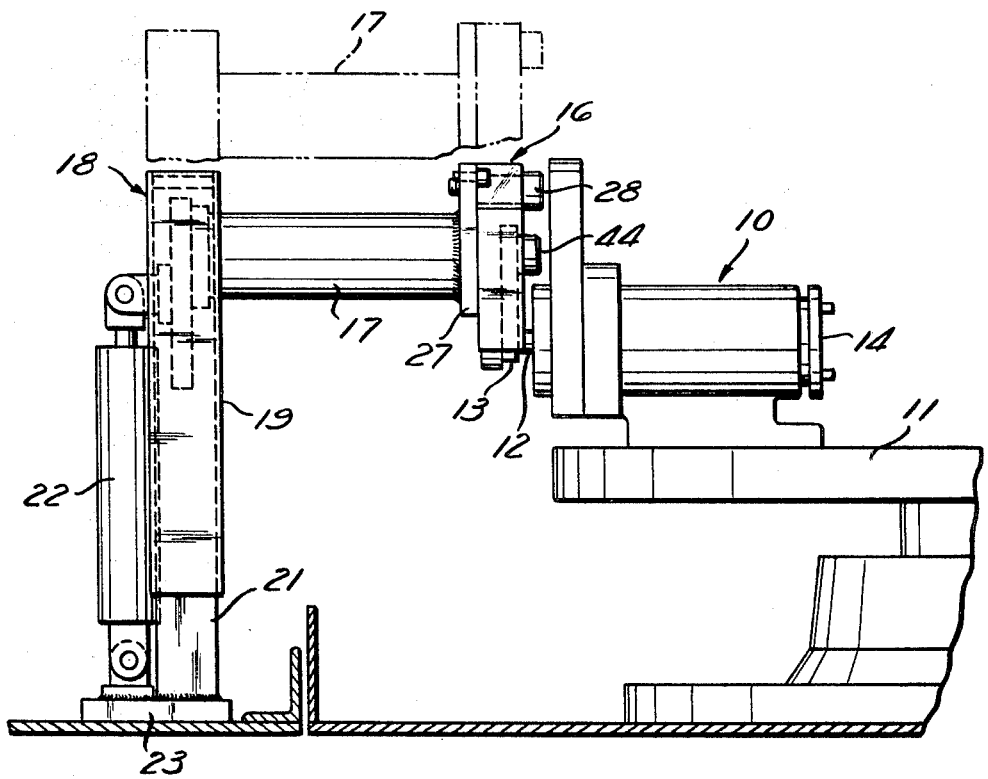
FIG. 2 is a side elevation of the mechanism illustrated in FIG. 1.

FIGS. 1 and 2 illustrate an automatic wrenching mechanism according to this invention as it may be installed for use in an indexing machine system of the type described in detail in my copending application cited above. In such a system, a plurality of work support assemblies 10 are mounted on an indexing table 11 for progressive movement through a plurality of work stations as the table rotates with step-by-step indexing rotation. In FIGS. 1 and 2, only a single workpiece holder assembly 10 is illustrated and reference may be made to my copending application for a detailed description of the entire system. The holder assembly illustrated in FIGS. 1 and 2 is positioned by the table 11 at the illustrated unloading station where the finished workpiece is removed from a supporting workpiece holder assembly. The workpiece holder assembly 10 is provided with a workpiece support 12 which is journaled for rotation about its axis and is threaded to receive a workpiece 13. The workpiece may be any type of article provided with threads, to receive the threads on the support 12, and wrenching flats. Such a workpiece may be, for example, a part of a pipe union which has been partially or completely machined at the work stations around the indexing table 11 before it reaches the illustrated unloading station. The workpiece holder is connected to be rotated through a clutching mechanism, part of which is illustrated at 14. Reference may be made to my copending application referred to above for a detailed description of a workpiece holder and clutching mechanism.

A wrenching assembly 16 is mounted on a support tube 17 which is, in turn, carried by a vertically movable carriage assembly 18. In the illustrated embodiment, the carriage assembly 18 includes two square section tubular members 19 which fit over associated rectangular support columns 21 so that the carriage can be moved vertically between an idle position illustrated in phantom and an operative position illustrated in full line. A piston and cylinder actuator 22 is connected at one end to the support base 23 and at its other end to the carriage 18 to provide power operation for moving the carriage up and down between the operative and idle positions. The actuator 22 may be hydraulic or pneumatic and is preferably provided with spring means normally maintaining the carriage in the idle position. When such an arrangement is provided, the actuator 22 need only be a single-acting actuator and the carriage is normally maintained in its idle position excepting when actuating pressure is supplied. With such an arrangement, fail-safe operation is provided since a failure of the actuator or its supply system will result in positioning the wrenching assembly in a position clear of the workpieces.

Referring now to FIGS. 3 through 6, the wrenching assembly 16 includes a yoke 26 pivotally supported on a mounting plate 27 which is welded to the end of the tube support 17. A spacer bolt 28 is threaded into the plate 27 and is provided with a spacer portion 29 which is positioned within a bore 31 in the yoke 26 to provide the pivotal support of the yoke on the plate 27. With this structure, the yoke is free to swing a limited amount either way from the illustrated position about the axis of the bolt 28 for automatic alignment of the wrenching mechanism as will be discussed in more detail below. The yoke 26 is cut off at its upper corners to provide a pair of opposed stop surfaces 32. Bolts 33 threaded into the plate 27 coact with the stop surfaces 32 to limit the extent of pivotal movement of the yoke 26.

A pair of similar but opposite gripper jaws 36 and 37 are removably mounted on the yoke 26 for limited vertical movement with respect thereto. The yoke 26 is formed with a pair of similar but opposite semi-cylindrical camming guide surfaces 38 which are inclined inwardly in an upward direction and mate with convex guide surfaces 39 formed on the associated jaw members 36 and 37.

Each of the jaw members 36 and 37 is formed with a groove 41 extending substantially parallel to the associated guide surface 39 which is proportioned to receive a pin 42. The pins 42 serve to retain the associated guide surfaces 38 and 39 in substantial contact when the jaw members are not gripping a workpiece or the like. Each of the grooves 41 is formed with a lateral section 43 at one end so that the jaws may be slipped into place or removed from the yoke by lateral movement of the jaws while the pins are in the lateral portions 43.

The vertical positioning of the jaws is provided by a stop bolt 44 threaded into the yoke 26. The stop bolt 44 is threaded into the yoke while it is positioned within a corresponding recess 46 formed in each of the jaws. The recesses are proportioned so that they provide spaced upper and lower stop surfaces 46a and 46b respectively which engage the head of the lock bolt 44 to limit the degree of movement of the jaws when the wrenching mechanism is assembled. The elements are proportioned so that the jaws can move to an extended position at which time the upper stop surfaces 46a engage the lock bolt 44 before the pins 42 reach the lateral groove portions 43. Removal and replacement of the jaws, therefore, merely requires the removal of the lock pin bolt 44 so that the jaws can be moved beyond their normal extended position until the associated pin 42 is aligned with the lateral groove 43. The reassembly is accomplished by positioning the jaws and replacing the lock bolt 44.

Each of the jaws is formed with a gripping surface 47 which is parallel to the gripping surface of the other jaw and substantially opposite thereto when the jaws are assembled in the yoke. Extending inwardly from the upper end of the wrenching surface 47 are operating surfaces 48 which engage the top of an article to be gripped when the yoke and article are moved toward each other. It is engagement between the article and the operating surfaces 48 which causes the jaws to be moved from their extended positions toward their gripping position.

Figure 7A:
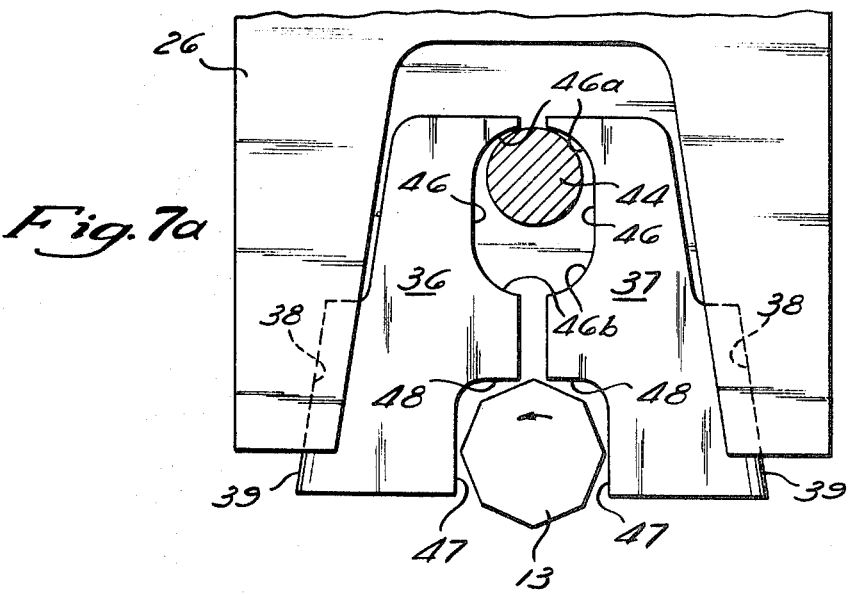
FIGS. 7a and 7b are fragmentary views showing progressive positions of the wrenching mechanism as it grips a workpiece.
Figure 7B:
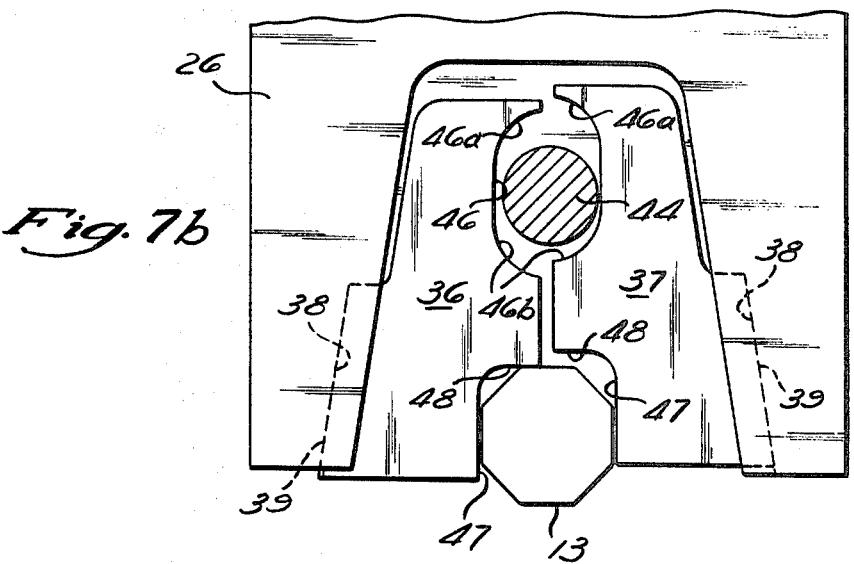

The operation of the wrenching mechanism can be best understood by referring to FIGS. 7a and 7b. As the wrenching mechanism is brought down onto the workpiece 13 carried and rotated by the support 12, a condition substantially as illustrated in FIG. 7a is reached. In this condition the jaws 36 and 37 are extended and the opposed gripping faces 47 are spaced apart a distance greater than the maximum lateral dimension of the corresponding portion of the workpiece 13. Therefore, the workpiece is enveloped by the jaws while it is still rotating as illustrated in FIG. 7a. If there is any misalignment between the workpiece 13 and the gripping surfaces 47, the wrenching mechanism including the jaws and the yoke pivot automatically one way or another about the pivot mounting bolt 28.

When a condition as illustrated in FIG. 7a is reached, the jaws have been carried downwardly to a sufficient degree so that the upper portion of the article engages the operating surfaces 48. This limits downward movement of the jaws with the yoke so further downward movement of the yoke produces relative movement between the jaws and the yoke moving the jaws toward the gripping position. As the jaws move toward the gripping position, the gripping surfaces 47 move toward each other until they engage the workpiece. If the first engagement occurs at the corners as substantially illustrated in FIG. 7a, a workpiece will not be immediately gripped, but will continue to rotate. Such rotation occurs with the point of the workpiece engaging the gripping surface 47 of the jaw 37 in a manner tending to push the jaw 37 upwardly towards its gripping position. Downward movement of the jaw 36, however, is prevented by engagement of its operating surface 48 and the top of the workpiece. Because the two jaws can move independently with respect to the yoke, the final gripping often occurs with the jaws displaced from each other as illustrated in FIG. 7b. In this instance the jaw 37 has been pushed upwardly by engagement of the corner of the rotating piece as illustrated in FIG. 7 and a final gripping with tight engagement between the flats of the workpiece and the gripping surfaces 47 is achieved. During this final gripping the yoke may pivot over to carry the griping surface 47 of the jaw 36 into engagement with the wrenching flat. If the two jaws were restrained to move together, the jaw 37 could not kick upwardly and difficulty would often occur when attempting to grip the rotating workpiece. It is recognized, however, that a final griping does not always result in a difference in vertical movement of one jaw with respect to the other.

The yoke is formed so that the camming surfaces extend past the gripping zone. Therefore, there is no tendency for the jaws to tip. The angle of inclination of the camming surfaces is preferably sufficiently small with respect to the associated gripping surfaces so that they constitute locking angles. Therefore, the jaws will remain in the gripping position as long as the workpiece remains on the work holder. Once gripping occurs, the workpiece is held against rotation with the work holder and the workpiece is threaded off the work holder.

As soon as the workpiece is free of the work holder the jaws can drop down under the influence of gravity, causing release of the workpiece. Since no torque is aplied to the workpiece after it is free of the workpiece support, a locking action does not continue. After the workpiece drops from the wrenching mechanism, the actuator 22 is operated to move the wrenching mechanism upwardly to its idle position so that the indexing table 11 can move the subsequent workpiece into position for removal.

In some instances where the wrenching mechanism is intended for use in other than a vertical position, a spring may be located between the upper end of each jaw and the yoke to bias the jaws toward the extended position in the same manner as the gravity does in the illustrated embodiment. Further in some instances a wrenching assembly may utilize a single movable jaw having a gripping surface 47 parallel to a fixed opposed gripping surface formed on, or mounted on, the yoke. Such a wrenching mechanism should be arranged so that it is applied to a workpiece rotating in a direction tending to cause movement of the single jaw toward the gripping position. Such an arrangement, however, does not provide the ability to grip pieces working in either direction with the same efficiency as the illustrated embodiment.

In actual tests a wrenching mechanism, as illustrated has performed with substantially complete reliability and has gripped rotating workpieces for removing from an indexing machine system in the manner described. Such workpieces were rotating at a speed in excess of 60 r.p.m. at the time gripping occurs. It has been found that the wrenching mechanism does not damage or wear the corners of the workpiece to any appreciable extent and that proper gripping and removal of the workpiece has occurred even though such workpieces were tightly threaded onto the workpiece support.

Although a preferred embodiment of this invention is illustrated, it is to be understood that various modifications and rearrangements may be resorted to without departing from the scope of the invention disclosed.

I claim:

1. A wrenching mechanism for gripping an article formed with wrenching flats comprising a base, a yoke on said base, a pair of jaws mounted on said base for independent movement between normal extended positions and gripping positions, said jaws being formed with opposed substantially parallel gripping surfaces adapted to engage the wrenching flats of said article, said yoke and each jaw being formed with mating camming surfaces inclined with respect to the associated gripping surface in converging directions so that movement of said jaws toward said gripping positions causes said gripping surfaces to move toward each other, means maintaining said jaws against their associated camming surfaces, said jaws being formed with operating surfaces extending toward each other operable to be engaged by said article after such article is positioned between said jaws and while said jaws are in said extended position, relative movement of said yoke and article toward each other causing engagement between said article and operating surfaces resulting in movement of said jaws to said gripping positions, said camming surfaces being formed so that said gripping surfaces are spaced apart a distance greater than the maximum corresponding width of said article when said jaws are in said extended position whereby said yoke and article may be fully rotated relative to each other when said jaws are in said extended position.

2. A wrenching mechanism as set forth in claim 1 wherein said yoke is mounted so that gravity urges said jaws toward said extended position.

3. A wrenching mechanism as set forth in claim 1 wherein said yoke is mounted on said base so that the jaw portion thereof is laterally movable.

4. A wrenching mechanism as set forth in claim 3 wherein said yoke is pivotally mounted on said base.

5. A wrenching mechanism as set forth in claim 1 wherein said operating surfaces extend substantially perpendicular to said camming surfaces and the angle of inclination of each of said camming surfaces with respect to the associated gripping surfaces is a locking angle.

6. A wrenching mechanism as set forth in claim 1 wherein said means for maintaining said jaws against their associated camming surfaces includes a pin mounted on said yoke for each jaw which extends into a groove formed in each jaw substantially parallel to the associated camming surface.

7. A wrenching mechanism as set forth in claim 6 wherein said camming surfaces extend along opposite sides of said gripping surfaces.

8. A wrenching mechanism as set forth in claim 7 wherein each jaw is formed with spaced opposed stop surfaces, and a stop member is mounted on said yoke to engage said stop surfaces and limit the movement of said jaws relative to said yoke.

9. An automated machine system wherein indexing means are provided to automatically move an article to a gripping position and cause rotation of said article in said gripping position, and a wrenching mechanism as set forth in claim 1 is mounted for movement from an idle position into a gripping position in which it engages and grips a rotating article carried by said indexing mechanism, and power means are provided to move said wrenching mechanism between said idle position and gripping position.

10. A wrenching mechanism for gripping an article formed with wrenching flats comprising a base, a yoke pivoted on said base, a jaw mounted on said base for movement between a normal extended position and gripping position, said jaw being formed with a gripping surface adapted to engage the wrenching flats of said article, a second gripping surface on said jaw parallel to and opposite to said first gripping surface, said yoke and jaw being formed with mating camming surfaces inclined with respect to first gripping surface so that movement of said jaw toward said gripping position causes said first gripping surface to move toward said second gripping surface, means maintaining said jaw against its associated camming surface, said jaw being formed with an operating surface extending toward said second gripping surface operable to be engaged by said article after such article is positioned between said gripping surfaces and while said jaw is in said extended position, relative movement of said yoke and article toward each other causing engagement between said article and operating surface resulting in movement of said jaw to said gripping position, said camming surfaces being formed so that said gripping surfaces are spaced apart a distance greater than the maximum corresponding width of said article when said jaw is in said extended position whereby said yoke and article may be fully rotated relative to each other when said jaw is in said extended position.

References Cited

UNITED STATES PATENTS

| 2,968,090 | 1/1961 | Cohrs et al. | 29—240 |
| 1,561,812 | 11/1925 | White | 81—128 |
| 3,195,381 | 7/1965 | Meggs | 81—128 |

JAMES L. JONES, Jr., Primary Examiner

U.S. Cl. X.R.

81—128; 10—155